(12) United States Patent
Rhyne et al.

(10) Patent No.: US 7,201,194 B2
(45) Date of Patent: Apr. 10, 2007

(54) NON-PNEUMATIC TIRE

(75) Inventors: Timothy B. Rhyne, Greenville, SC (US); Ronald H. Thompson, Greenville, SC (US); Steven M. Cron, Simpsonville, SC (US); Kenneth W. DeMino, Anderson, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 110 days.

(21) Appl. No.: 10/782,999

(22) Filed: Feb. 20, 2004

(65) Prior Publication Data

US 2004/0159385 A1 Aug. 19, 2004

Related U.S. Application Data

(63) Continuation of application No. 10/081,571, filed on Feb. 22, 2002, now Pat. No. 6,769,465, and a continuation-in-part of application No. PCT/US01/26379, filed on Aug. 24, 2001.

(51) Int. Cl.
  *B60B 9/26* (2006.01)
(52) U.S. Cl. .................. 152/5; 152/11; 152/246; 152/270
(58) Field of Classification Search .............. 152/1, 152/5, 7, 11, 12, 69, 80, 246, 253, 256, 258, 152/259, 270, 273, 275, 280, 393, 394
See application file for complete search history.

(56) References Cited

U.S. PATENT DOCUMENTS

| | | | | |
|---|---|---|---|---|
| 811,232 | A * | 1/1906 | Lang et al. | 152/328 |
| 1,101,702 | A * | 6/1914 | Lakoff | 152/253 |
| 1,147,600 | A * | 7/1915 | Borland | 152/153 |
| 1,268,078 | A * | 5/1918 | Lambert | 152/325 |
| 1,349,914 | A * | 8/1920 | Pratt | 152/323 |
| 1,414,543 | A * | 5/1922 | Bessler | 152/327 |
| 1,414,544 | A * | 5/1922 | Bessler | 152/327 |
| 1,493,922 | A * | 5/1924 | Deister | 152/325 |
| 1,494,797 | A * | 5/1924 | Nimschke | 152/308 |
| 1,502,908 | A | 7/1924 | Cozatt | |

(Continued)

FOREIGN PATENT DOCUMENTS

| EP | 0 159 888 B1 | 3/1991 |
|---|---|---|
| JP | 1-311902 | * 12/1989 |

*Primary Examiner*—Russell D. Stormer
(74) *Attorney, Agent, or Firm*—E. Martin Remick; Frank J. Campigot; Adam Arnold

(57) ABSTRACT

A structurally supported tire includes a ground contacting tread portion, a reinforced annular band disposed radially inward of the tread portion, and a plurality of web spokes extending transversely across and radially inward from the reinforced annular band and anchored in a wheel or hub. The reinforced annular band comprises an elastomeric shear layer, at least a first membrane adhered to the radially inward extent of the elastomeric shear layer and at least a second membrane adhered to the radially outward extent of the elastomeric shear layer. Each of the membranes has a longitudinal tensile modulus sufficiently greater than the shear modulus of the shear layer so that when under load the ground contacting portion of the tire deforms to a flat contact region through shear strain in the shear layer while maintaining constant the length of the membranes, the web spokes transmitting load forces between the annular band and the hub through tension in the web spokes not connected to the ground contacting portion of the tire.

31 Claims, 9 Drawing Sheets

U.S. PATENT DOCUMENTS

| | | | |
|---|---|---|---|
| 1,557,437 A * | 10/1925 | Dodge | 152/328 |
| 1,647,871 A * | 11/1927 | Lea | 152/260 |
| 2,206,230 A * | 7/1940 | Maccabee | 152/253 |
| 2,742,941 A * | 4/1956 | Johnson | 152/326 |
| 4,226,273 A | 10/1980 | Long | |
| 4,262,726 A * | 4/1981 | Welter | 152/531 |
| 4,425,953 A * | 1/1984 | Rohde et al. | 152/532 |
| 4,832,098 A * | 5/1989 | Palinkas et al. | 152/7 |
| 4,917,162 A * | 4/1990 | De Longcamp | 152/5 |
| 4,921,029 A | 5/1990 | Palinkas et al. | |
| 4,945,962 A * | 8/1990 | Pajtas | 152/7 |
| 5,139,066 A | 8/1992 | Jarman | |
| 6,170,544 B1 * | 1/2001 | Hottebart | 152/11 |
| 6,615,885 B1 * | 9/2003 | Ohm | 152/11 |
| 6,769,465 B2 * | 8/2004 | Rhyne et al. | 152/197 |
| 6,983,776 B2 * | 1/2006 | Thompson et al. | 152/197 |
| 6,994,134 B2 * | 2/2006 | Grah | 152/197 |
| 7,013,939 B2 * | 3/2006 | Rhyne et al. | 152/5 |

* cited by examiner

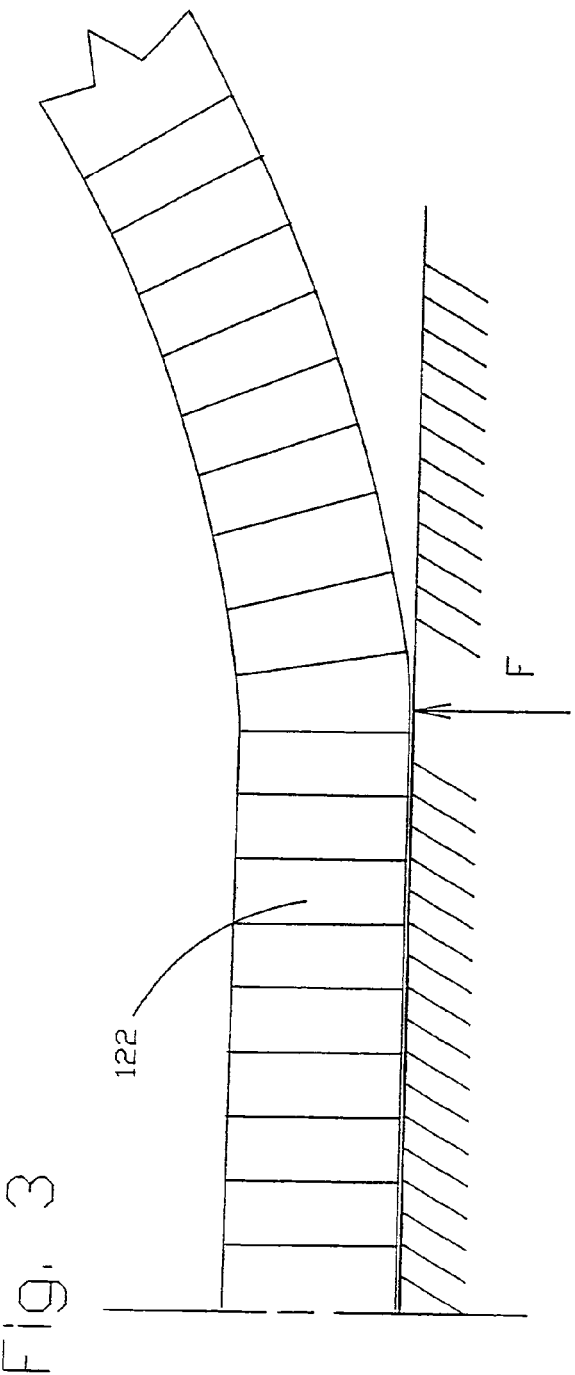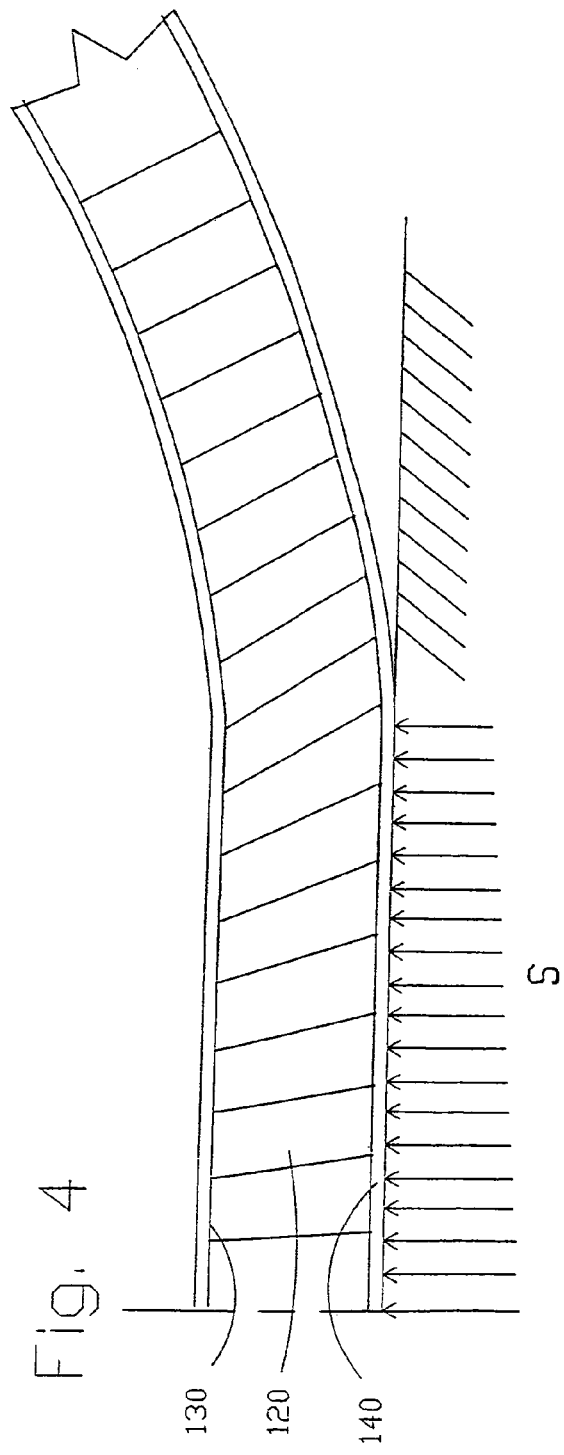

NON-PNEUMATIC TIRE

This is a continuation of PCT Application No. PCT/US01/26379 filed on Aug. 24, 2001 and a continuation-in-part of U.S. application Ser. No. 10/081,571 filed on Feb. 22, 2002, now U.S. Pat. No. 6,769,465 issued Aug. 3, 2004.

BACKGROUND AND SUMMARY OF THE INVENTION

The invention relates to a non-pneumatic, structurally supported tire. More particularly, the invention relates to a non-pneumatic tire that supports a load with its structural components and has pneumatic tire-like performance capabilities to serve as a replacement for pneumatic tires.

The pneumatic tire has capabilities in load carrying, road shock absorption, and force transmission (accelerating, stopping, and steering) that make it the preferred choice for use on many vehicles, most notably, bicycles, motorcycles, automobiles, and trucks. These capabilities have also been highly advantageous in the development of the automobile and other motor vehicles. Pneumatic tire capabilities in shock absorption are also useful in other applications, for example, in carts carrying sensitive medical or electronic equipment.

Conventional non-pneumatic alternatives, for example, solid tires, spring tires, and cushion tires lack the performance advantages of pneumatic tires. In particular, solid and cushion tires rely on compression of the ground-contacting portion for load support. These types of tires can be heavy and stiff and lack the shock absorbing capability of pneumatic tires. When made more resilient, conventional non-pneumatic tires lack the load support or endurance of pneumatic tires. Accordingly, except in limited situations, known non-pneumatic tires have not found wide use as substitutes for pneumatic tires.

A non-pneumatic tire having performance characteristics similar to those of pneumatic tires would overcome the various deficiencies in the art and would be a welcome improvement.

A structurally supported, non-pneumatic tire in accordance with the invention includes a reinforced annular band that supports the load on the tire and a plurality of web spokes that transmit in tension the load forces between the annular band and a wheel or hub. Accordingly, a tire of the invention supports its load solely through the structural properties and, contrary to the mechanism in pneumatic tires, without support from internal air pressure.

According to an embodiment useful as a tire on a motor vehicle, a structurally supported tire includes a tread portion, a reinforced annular band radially inward of the tread portion, a plurality of web spokes extending transversely across and radially inward from the annular band toward a tire axis, and means for interconnecting the web spokes to a wheel or hub.

In a pneumatic tire, the ground contact pressure and stiffness are a direct result of the inflation pressure, and are interrelated. The tire in accordance with the invention has stiffness properties and a ground contact pressure that are based on the structural components of the tire, and, advantageously, may be specified independent of one another.

The structurally supported tire of the invention does not have a cavity for containing air under pressure, and accordingly, does not need to form a seal with the wheel rim to retain internal air pressure. The structurally supported tire does not, therefore, require a wheel as understood in the pneumatic tire art. For the purposes of the following description, the terms "wheel" and "hub" refer to any device or structure for supporting the tire and mounting to the vehicle axle, and are considered interchangeable herein.

According to the invention, the annular band comprises an elastomeric shear layer, at least a first membrane adhered to the radially inward extent of the elastomeric shear layer, and at least a second membrane adhered to the radially outward extent of the elastomeric shear layer. The membranes have a circumferential tensile modulus of elasticity sufficiently greater than the shear modulus of elasticity of the elastomeric shear layer such that, under an externally applied load, the ground contacting tread portion deforms from essentially a circular shape to a shape conforming with the ground surface while maintaining an essentially constant length of the membranes. Relative displacement of the membranes occurs by shear in the shear layer. Preferably, the membranes comprise superposed layers of essentially inextensible cord reinforcements embedded in an elastomeric coating layer.

The elastomeric shear layer is formed of a material, such as natural or synthetic rubber, polyurethane, foamed rubber and foamed polyurethane, segmented copolyesters and block co-polymers of nylon. Preferably, the shear layer material has a shear modulus or about 3 MPa to about 20 MPa. The annular band has the ability to bend from a normal circular shape while under load to conform to a contact surface, such as a road surface.

The web spokes act in tension to transmit load forces between the wheel and the annular band, thus, among other functions, supporting the mass of a vehicle. Support forces are generated by tension in the web spokes not connected to the ground-contacting portion of the annular band. The wheel or hub can be said to hang from the upper portion of the tire. Preferably, the web spokes have a high effective radial stiffness in tension and a low effective radial stiffness in compression. The low stiffness in compression allows the web spokes attached to the ground-contacting portion of the annular band to bend for absorbing road shocks and for better conforming the annular band to the irregularities in the road surface.

The web spokes also transmit the forces required for accelerating, stopping, and cornering. The arrangement and orientation of the web spokes can be selected to obtain the desired function. For example, in applications where relatively low circumferential forces are generated, the web spokes can be arranged radially and in parallel with the tire axis of rotation. To provide stiffness in the circumferential direction, web spokes perpendicular to the axis of rotation can be added, alternating with the axis-aligned web spokes. Another alternative is to arrange the web spokes oblique to the tire axis to provide stiffness in both the circumferential and axial directions. Another alternative is to orient the web spokes to be in an alternating oblique arrangement, that is, in a zig-zag pattern when viewed on the equatorial plane.

To facilitate the bending of the web spokes of the ground contacting portion of the tread, the spokes can be curved. Alternatively, the web spokes can be pre-stressed during molding to bend in a particular direction.

According to an embodiment of the invention, a structurally supported resilient tire comprises a ground contacting tread portion, a reinforced annular band radially inward of the tread portion, and a plurality of web spokes extending radially inward from the reinforced annular band, means for interconnecting the plurality of web spokes to a wheel or hub, the reinforced annular band comprising an elastomeric shear layer, at least a first membrane adhered to the radially inward extent of the elastomeric shear layer and at least a second membrane adhered to the radially outward extent of the elastomeric shear layer.

According to another embodiment, the invention comprises a structurally supported wheel-tire, comprising a reinforced annular band comprising an elastomeric shear layer, at least a first membrane adhered to a radially inward extent of the elastomeric shear layer and at least a second membrane adhered to a radially outward extent of the elastomeric shear layer, wherein each of the membranes has a longitudinal tensile modulus greater than the shear modulus of the shear layer, a tread adhered to a radially outer extent of the reinforced annular band, a plurality of web spokes extending substantially transversely across and radially inward from the reinforced annular band, and a wheel radially inward of the plurality of web spokes and integrated therewith.

BRIEF DESCRIPTION OF THE DRAWINGS

The invention will be better understood through reference to the following description and the appended drawings, in which:

FIG. 3 is a schematic diagram illustrating the ground reaction forces for a reference homogeneous band not exhibiting shear deformation;

FIG. 4 is a schematic diagram illustrating the ground reaction forces for an annular band in accordance with the invention;

DETAILED DESCRIPTION OF THE INVENTION

The following terms are defined as follows for this description:

"Equatorial Plane" means a plane that passes perpendicular to the tire axis of rotation and bisects the tire structure.

"Meridian Plane" means a plane that passes through and includes the axis of rotation of the tire.

"Modulus" of elastomeric materials means the tensile modulus of elasticity at 10% elongation measured per ASTM Standard Test Method D412.

"Modulus" of the membranes means the tensile modulus of elasticity at 1% elongation in the circumferential direction multiplied by the effective thickness of the membrane. This modulus can be calculated by Equation 1, below, for conventional tire steel belt materials. This modulus is noted with a prime (') designation.

"Shear Modulus" of elastomeric materials means the shear modulus of elasticity and is defined equivalent to one-third the tensile modulus of elasticity as defined above for elastomeric materials.

"Hysteresis" means the dynamic loss tangent (tan Δ) measured at operating strain, temperature, and frequency. One of ordinary skill in the art will understand that the operating conditions differ for particular applications, for example, the different load and speed requirements for golf carts and sports cars, and that the strain, temperature, and frequency are to be specified for the particular application.

Figure 1:
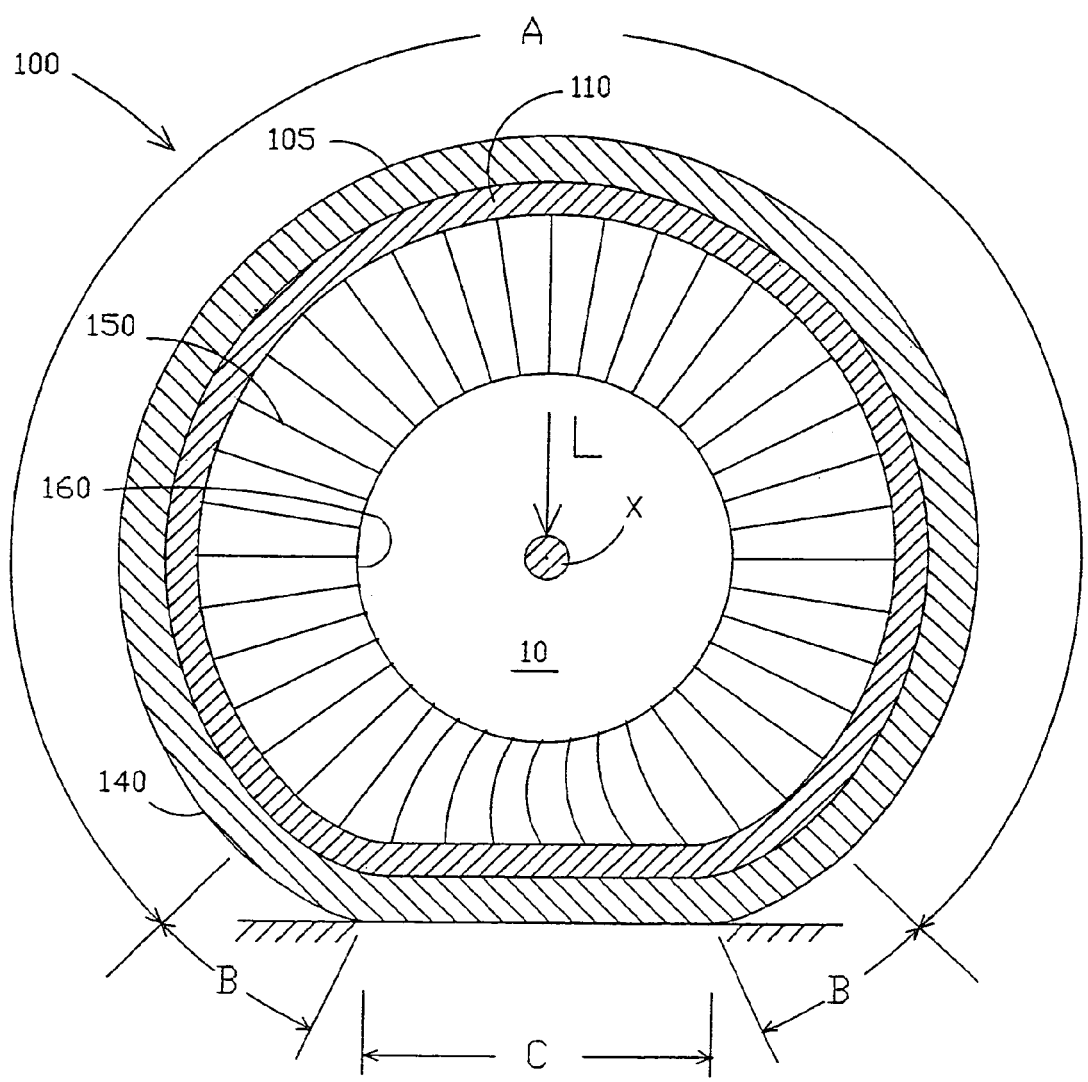
FIG. 1 is a schematic view in the equatorial plane of a tire of the invention under load.

A structurally supported resilient tire in accordance with the invention is shown in schematic view in FIG. 1 in the equatorial plane. Structurally supported means that the tire carries a load by its structural components without the support of gas inflation pressure. The structures disclosed for the several variations of a structurally supported resilient tire utilize similar basic components. Reference numerals depicted in the drawings follow a consistent pattern for each variation. The figures are not drawn to scale, and the dimensions of elements have been exaggerated or reduced for clarity of the illustration.

Figure 15:
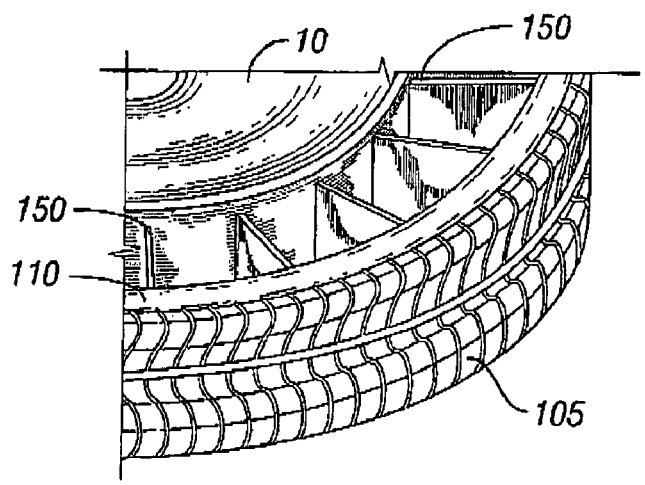
FIG. 15 is a perspective view of a portion of an exemplary embodiment of a tire in accordance with the present invention.

The tire 100 shown in FIG. 1 has a ground contacting tread portion 105, a reinforced annular band 110 disposed radially inward of the tread portion, a plurality of web spokes 150 extending transversely across and radially inward from the annular band, and a mounting band 160 at the radially inner end of the web spokes. The mounting band 160 anchors the tire 100 to a wheel 10 or hub. As used herein "extending transversely" means that the web spokes 150 may be axially aligned, or may be oblique to the tire axis. Further, "extending radially inward" means that the web spokes 150 may lie in a plane radial to the tire axis or may be oblique to the radial plane. FIG. 15 is a perspective view of a portion of an exemplary embodiment of a tire in accordance with the present invention showing the web spokes 150 extending substantially transversely across and radially inward from the reinforced annular band 110. In addition, as explained below, a second plurality of web spokes may extend in the equatorial plane.

Figure 2:
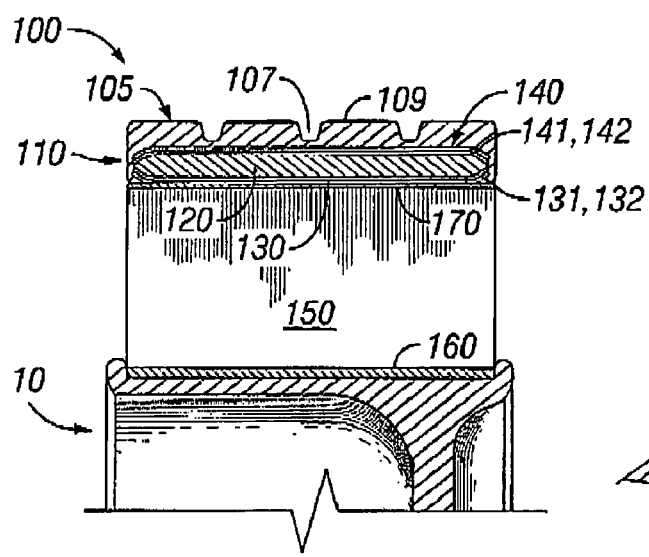
FIG. 2 is a section view of a tire in accordance with the invention taken in the meridian plane.

Referring to FIG. 2, which shows the tire 100 and wheel 10 in section view in the meridian plane, the reinforced annular band 110 comprises an elastomeric shear layer 120, a first membrane 130 adhered to the radially innermost extent of the elastomeric shear layer 120, and a second membrane 140 adhered to the radially outermost extent of the elastomeric shear layer 120. The membranes 130 and 140 have a tensile stiffness that is greater than the shear stiffness of the shear layer 120 so that the reinforced annular band 110 undergoes shear deformation under load.

The reinforced annular band 110 supports loads on the tire. As indicated in FIG. 1, a load L placed on the tire axis of rotation X is transmitted by tension in the web spokes 150 to the annular band 110. The annular band 110 acts in a manner similar to an arch and provides a circumferential compression stiffness and a longitudinal bending stiffness in the tire equatorial plane sufficiently high to act as a load-supporting member. Under load, the annular band deforms in contact area C with the ground surface through a mechanism including shear deformation of the band. The ability to deform with shear provides a compliant ground contact area C that acts similar to that of a pneumatic tire, with similar advantageous results.

Referring to FIGS. 3 and 4, the advantage of the shear mechanism of the annular band 110 of the invention may be understood by comparison to a rigid annular band 122 comprised of a homogeneous material, for example, a metallic ring, that does not allow for more than insignificant shear deformation under load. In the rigid annular band 122 of FIG. 3, the pressure distribution satisfying the equilibrium force and bending moment requirements is made up of a pair of concentrated forces F located at each end of the contact area, one end of which is shown in FIG. 3. By contrast, if the annular band comprises a structure in accordance with the invention as shown in FIG. 4 of shear layer 120, inner reinforcement 130, and outer reinforcement 140, which prescribes shear deformation, the resulting pressure distribution S on the contact region is substantially uniform.

The beneficial result of the annular band in accordance with the invention is a more uniform ground contact pressure S throughout the length of the contact area, which is similar to a pneumatic tire and improves the tire function over other non-pneumatic tires.

In typical solid and cushion tires, the load is supported by compression of the tire structure in the contact area, and load capacity is limited by the amount and type of material present in the contact area. In certain types of spring tires, a rigid outer ring supports the load on the tire and is connected to the hub or wheel by resilient spring members. However, a rigid ring does not have a shear mechanism, and thus, as explained above, a rigid ring has concentrated ground reaction forces at the ends of the contact area, which affects the ability of the tire to transmit forces to the ground and to absorb ground shocks.

The shear layer 120 comprises a layer of elastomeric material having a shear modulus of about 3 MPa to about 20 MPa. Materials believed to be suitable for use in the shear layer 120 include natural and synthetic rubbers, polyurethanes, foamed rubbers and polyurethanes, segmented copolyesters, and block co-polymers of nylon. Repeated deformation of the shear layer 120 during rolling under load causes hysteretic losses leading to heat buildup in the tire. Thus, hysteresis of the shear layer should be specified to maintain an operating temperature below the allowable operating temperature for the materials used. For conventional tire materials (e.g., rubber), for example, the hysteresis of the shear layer should be specified to generate a temperature below about 130° C. for tires in continuous use.

The tread portion 105 may have no grooves or may have a plurality of longitudinally oriented tread grooves 107 forming essentially longitudinal tread ribs 109 therebetween, as in the illustrative example of FIG. 2. In addition, the tread 105 is shown as being flat from edge to edge. This will be suitable for automobiles and other similar vehicle, but rounded treads may be used for bicycles, motorcycles and other two-wheeled vehicles. Any suitable tread sculpture may be used as is known to those of skill in the art.

According to a preferred embodiment, the first 130 and second 140 membranes comprise essentially inextensible cord reinforcements embedded in an elastomeric coating. For a tire constructed of elastomeric materials, membranes 130 and 140 are adhered to the shear layer 120 by the cured elastomeric materials. It is within the scope of the invention for membranes 130 and 140 to be adhered to the shear layer 120 by any suitable method of chemical or adhesive bonding or mechanical fixation.

The reinforcing elements in the membranes 130, 140 may be any of several materials suitable for use as tire belt reinforcements in conventional tires such as monofilaments or cords of steel, aramid or other high modulus textiles. For the illustrative tires described herein, the reinforcements are steel cords, each consisting of four wires of 0.28 mm diameter (4×0.28).

According to a preferred embodiment, the first membrane includes two reinforced layers 131 and 132 and the second membrane 140 also includes two reinforced layers 141 and 142.

Although the variations of the invention disclosed herein have cord reinforced layers for each of the membranes, any suitable material may be employed for the membranes which meets the requirements, described below, for the tensile stiffness, bending stiffness, and compressive buckling resistance properties required of the annular band. That is to say, the membrane structure may be any of several alternatives such as a homogeneous material (e.g., thin metal sheet), a fiber reinforced matrix, or a layer having discrete reinforcing elements.

In a first preferred embodiment, the first membrane 130 layers 131 and 132 have essentially parallel cords oriented at an angle of about 10° to about 45° relative to the tire equatorial plane. The cords of the respective layers have an opposite orientation. Similarly for the second membrane 140, layers 141 and 142 have essentially parallel cords oriented at angles between 10° and 45° relative to the equatorial plane. It is not required, however, for the cords of the layer pairs in a membrane to be oriented at mutually equal and opposite angles. For example, it may be desirable for the cords of the layer pairs to be asymmetric relative to the tire equatorial plane.

According to another embodiment, the cords of at least one layer of the membranes can be at or near 0° to the equatorial plane for increased tensile stiffness of the membrane.

The cords of each of the layers 131, 132 and 141, 142 are embedded in an elastomeric coating layer typically having a shear modulus of about 3 to 20 MPa. It is preferred that the shear modulus of the coating layers be substantially equal to the shear modulus of the shear layer 120 to insure that deformation of the annular band is primarily by shear deformation within shear layer 120.

The relationship between the shear modulus G of the elastomeric shear layer 120 and the effective longitudinal tensile modulus $E'_{membrane}$ of the membranes 130 and 140 controls the deformation of the annular band under an applied load. The effective tensile modulus $E'_{membrane}$ of the membrane using conventional tire belt materials and with membrane reinforcing cords oriented to at least 10° to the equatorial plane can be estimated by the following:

$$E'_{MEMBRANE} = (2D+t)\frac{E_{RUBBER}}{2(1-v^2)}\left[\left(\frac{P}{P-D}\right)\frac{2-(1+v)SIN^2(2\alpha)}{SIN^4\alpha} + \left(\frac{t}{D}\right)\frac{1}{TAN^2\alpha}\left(\frac{1}{TAN^2\alpha}-v\right)\right] \quad (1)$$

Where, $E_{rubber}$=Tensile modulus of the elastomeric coating material; P=Cord pace (cord centerline spacing) measured perpendicular to the cord direction; D=Cord diameter; v=Poisson's ratio for the elastomeric coating material; α=Cord angle with respect to the equatorial plan; and, t=Rubber thickness between cables in adjacent layers.

For a shear layer membrane in which the reinforcing cords are oriented at less than 10° to the equatorial plane, the following can be used to estimate the tensile modulus of the membrane $E'_{membrane}$:

$$E'_{membrane} = E_{cable} * V * t_{membrane} \quad (2)$$

where, $E_{cable}$ is the modulus of the cable, V is the volume fraction of the cable in the membrane, and $t_{membrane}$ is the thickness of the membrane.

For membranes comprising a homogeneous material or a fiber or other material reinforced matrix, the modulus is the modulus of the material or matrix.

Note that $E'_{membrane}$ is the elastic modulus of the membrane times the effective thickness of the membrane. When the ratio $E'_{membrane}/G$ is relatively low, deformation of the annular band under load approximates that of the homogeneous band and produces a non-uniform ground contact pressure as shown in FIG. 3. On the other hand, when the ratio $E'_{membrane}/G$ is sufficiently high, deformation of the annular band under load is essentially by shear deformation of the shear layer with little longitudinal extension or compression of the membranes. Accordingly, ground contact pressure is substantially uniform as in the example shown in FIG. 4.

According to the invention, the ratio of the longitudinal tensile modulus of the membrane $E'_{membrane}$ to the shear modulus G of the shear layer is at least about 100:1, and preferably at least about 1000:1.

The tire shown in FIG. 2 has a flat transverse profile for the tread portion 105, first membrane 130 and second membrane 140. The strains in the portion of the annular band in the contact region C (FIG. 1) will be compressive for the second membrane 140. As the vertical deflection of the tire increases, the contact length can increase such that the compressive stress in second membrane 140 exceeds the critical buckling stress, and a longitudinal buckling of the membrane occurs. This buckling phenomenon causes a longitudinally extending section of the contact region to have reduced contact pressure. A more uniform ground contact pressure throughout the length of the ground contacting region is obtained when buckling of the membrane is avoided. A membrane having a curved transverse section will better resist buckling in the contact area and is preferred when buckling under load is a concern.

Figure 5:
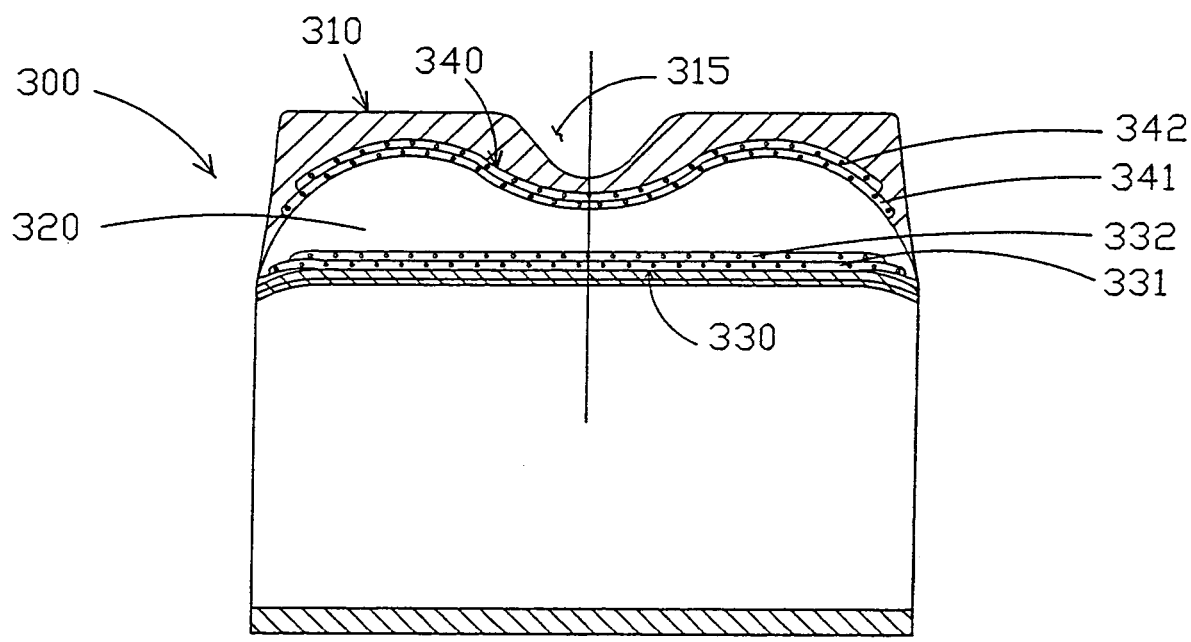
FIG. 5 is a section view of an alternative embodiment of a tire of the invention taken in the meridian plane.

A variation of the tire of the invention is shown in FIG. 5 wherein tire 300 has an undulated second membrane 340 having an amplitude of undulation in the radial direction and a wavelength of undulation in the axial direction. The amplitude of undulation is defined as the difference between the maximum and minimum radial extents of the membrane 340. The wavelength of undulation is defined as the axial distance between successive radial maxima of the membrane 340. The undulated second membrane 340 resists buckling due to compression in the contact zone like an arcuate membrane described above. Deforming the second membrane 340 from essentially a circular shape to a flat shape by an externally applied load occurs without longitudinal buckling of the second membrane and maintains an essentially uniform ground contact pressure of the ground contacting tread portion throughout the length of the ground contacting region. Thus, it is possible for tire 300 to have a second membrane 340 whose transverse radius of curvature may be specified to optimize ground contact stresses independent of its resistance to buckling. Preferably, second membrane 340 has two to five cycles of undulation, and has a wavelength of undulation of about 20% to about 50% of the rolling tread width of the tread portion 310. The amplitude of undulation is preferably between about 20% and 50% of the maximum shear layer 320 thickness and may be a constant or variable amplitude.

When the previously stated conditions for longitudinal tensile modulus $E'_{membrane}$ of the membranes and the shear modulus G of the shear layer are met and the annular band deforms substantially by shear in the shear layer, an advantageous relation is created allowing one to specify the values of shear modulus G and shear layer thickness h for a given application:

$$P_{eff} * R \approx G * h \quad (3)$$

Where, $P_{eff}$=Ground contact pressure; G=Shear modulus of layer 120; h=Thickness of layer 120; and R=Radial position of the second membrane relative to the axis of rotation.

Figure 13:
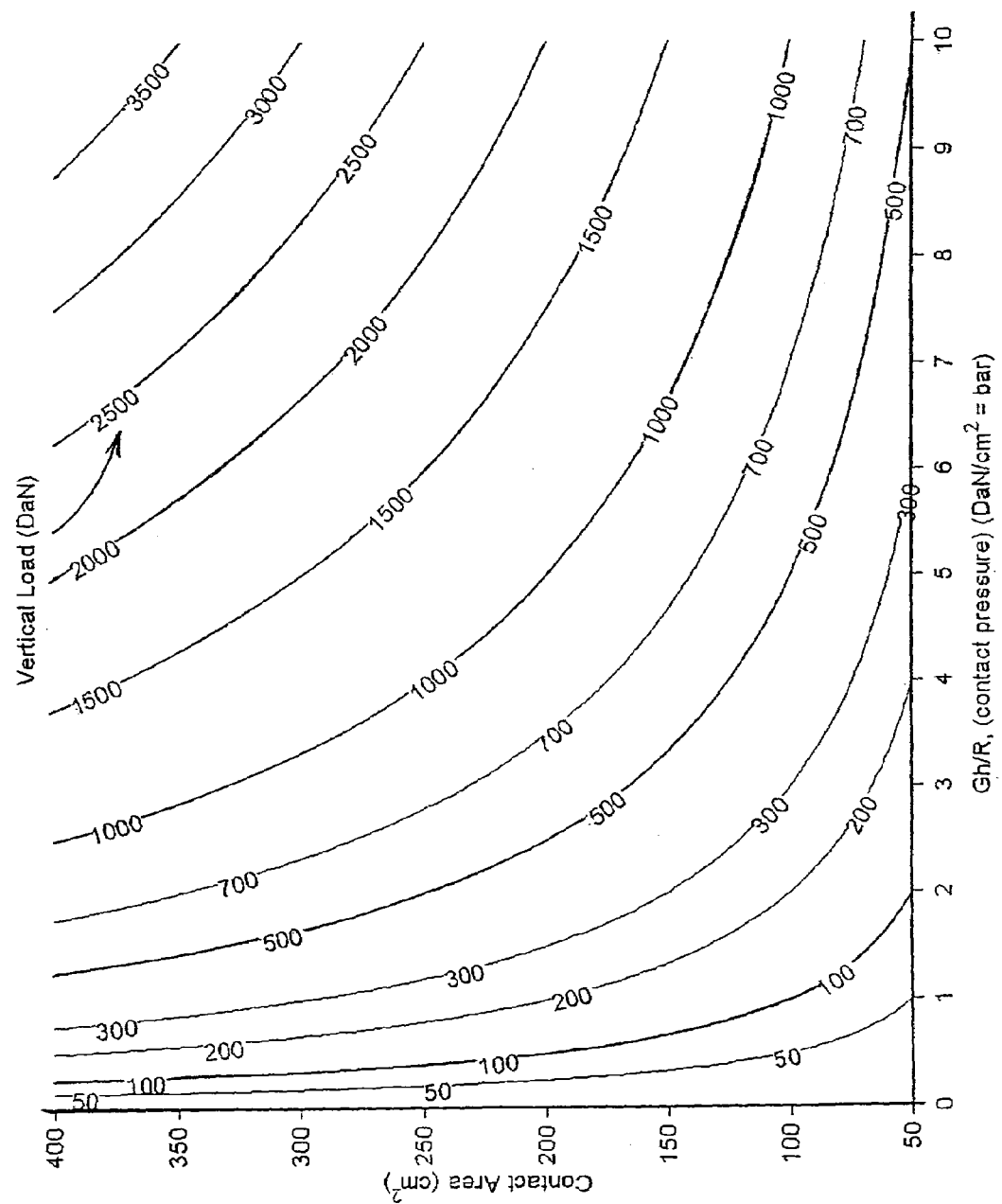
FIG. 13 illustrates graphically the relationship among contact area, contact pressure and vertical load for a tire in accordance with the invention.

$P_{eff}$ and R are design parameters chosen according to the intended use of the tire. Equation 3 suggests that the product of the shear modulus of elasticity of the shear layer times a radial thickness of the shear layer is approximately equal to a product of ground contact pressure times a radial position of the outermost extent of the second membrane. FIG. 13 graphically illustrates this relationship over a broad range of contact pressures and can be used to estimate the shear layer characteristics for many different applications.

Figure 6:
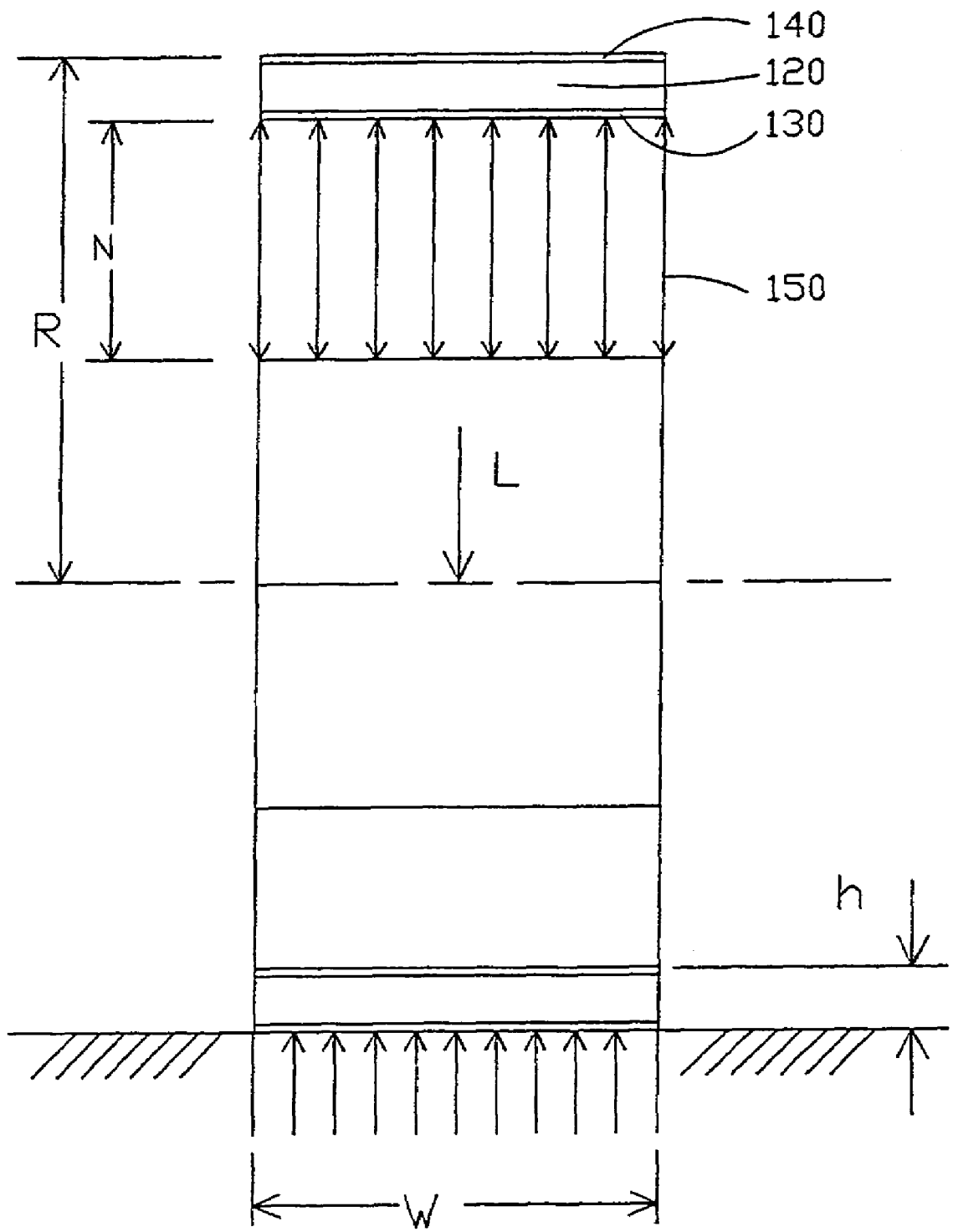
FIG. 6 is a schematic view in the meridian plane of a loaded tire of the invention showing certain reference dimensions to describe the load carrying mechanism.

Referring to FIG. 6, the web spokes 150 are substantially sheet-like elements having a length N in the radial direction, a width W in the axial direction corresponding generally to the axial width of the annular band 110, and a thickness perpendicular to the other dimensions. The thickness is much less than either the length N or the width W, and is preferably about 1% to 5% of the radius R of the tire, which allows a web spoke to buckle when under compression, as shown in FIG. 1. Thinner web spokes will bend in the contact area with substantially no compressive resistance, that is, without supplying more than an insignificant compressive force to load bearing. As the thickness of the web spokes increases, the web spokes may provide some compressive load bearing force in the ground contact area. The predominant load transmitting action of the web spokes as a whole, however, is tension. The particular web spoke thickness may be selected to meet the specific requirements of the vehicle.

According to a presently preferred embodiment, the web spokes 150 are formed of a material having high tensile modulus of about 10 to 100 MPa. The web spokes may be reinforced if desired. The web spoke material should also exhibit elastic behavior to return to original length after being strained to 30%, and to exhibit constant stress when the web spoke material is strained to 4%. Further, it is desirable to have a material with a tan Δ of not more than 0.1 at the relevant operating conditions. For example, commercially available rubber or polyurethane materials can be identified which meet these requirements. The inventors have found that Vibrathane B836 brand urethane from the Uniroyal Chemical division of Crompton Corporation of Middlebury, Conn. has been suitable for the web spokes.

Referring to FIG. 2, in one embodiment, the web spokes 150 are interconnected by a radially inner mounting band 160, which encircles the wheel or hub 10 to mount the tire. An interface band 170 interconnects the web spokes 150 at their radially outer ends. The interface band 170 connects the web spokes 150 to the annular band 110. For convenience, the web spokes, the mounting band 160, and the interface band 170 may be molded from a single material as a unit.

Figure 16:
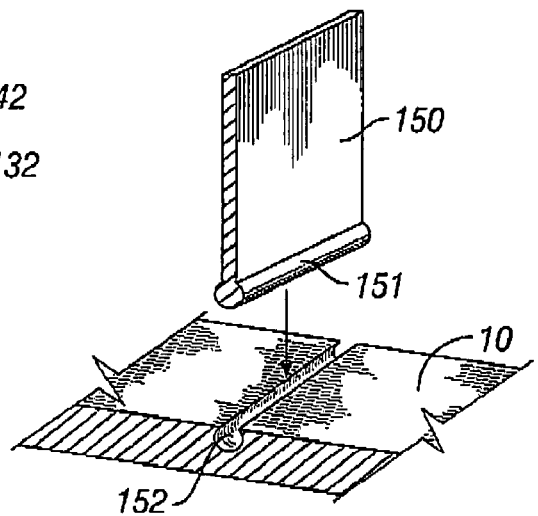
FIG. 16 is a perspective view of a portion of a web spoke having an enlarged end portion for fitting into an engaging slot in a wheel.

Alternatively, depending on the construction materials and process for the annular band 110 and hub or wheel 10, a separate mounting band 160 or interface band maybe eliminated and the web spokes molded or formed to directly adhere to the annular band and wheel. For example, if either of the annular band or the wheel or hub is formed with the same or compatible materials, the tire cold be manufactured with one step forming or molding the web spokes integrally with the annular band or wheel, in which case, the mounting band 160 and/or interface band 170 are integrally formed as part of the wheel or annular band. Further, the web spokes 150 could be mechanically attached to the wheel, for example by providing an enlarged portion 151 on the inner end of each web spoke that engages a slot 152 in the wheel 10 as shown in FIG. 16.

The manner in which a tire of the invention supports an applied load may be understood by reference to FIGS. 1 and 6. The region A of the annular band 110, that is, the portion not in ground contact, acts like an arch and the web spokes 150 are in tension T. The load L on the tire, transmitted from the vehicle (not shown) to the hub or wheel 10 essentially hangs from the arch of region A. The web spokes in the transition region B and contact region C are not in tension. According to a preferred embodiment, the web spokes are relatively thin and do not provide more than insignificant vertical load bearing force. As the tire rotates, of course, the specific portion of the annular band 110 acting as an arch continually changes, however, the concept of an arch is useful for understanding the mechanism.

Substantially purely tensile load support is obtained by having a web spoke that has high stiffness in tension but very low stiffness in compression. To facilitate buckling in the ground contact region, the web spokes may be curved. Alternatively, the web spokes can be molded with a curvature and straightened by thermal shrinkage during cooling to provide a predisposition to buckling.

The web spokes 150 should resist torsion between the annular band 110 and the wheel 10, for example, when torque is applied to the wheels. In addition, the web spokes 150 should resist lateral deflection when, for example, in turning or cornering. As will be understood, web spokes 150 that lie in the radial-axial plane, that is, are aligned with both the radial and axial directions, will have high resistance to axially directed forces, but, particularly if elongated in the radial direction, may have difficulty resisting torque in the circumferential direction. For certain vehicles and applications, for example, those producing relatively low acceleration forces, a web spoke package having relatively short spokes aligned with the radial direction will be suitable.

Figure 7:
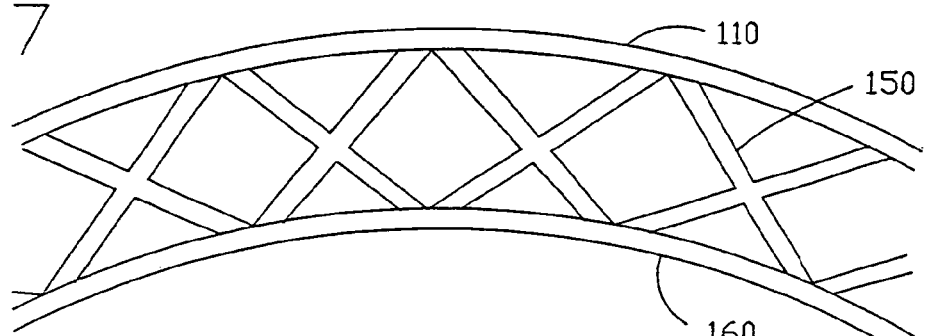
FIG. 7 is a section view showing an arrangement of web spokes in an X pattern for a tire viewed in the equatorial plane.
Figure 8:
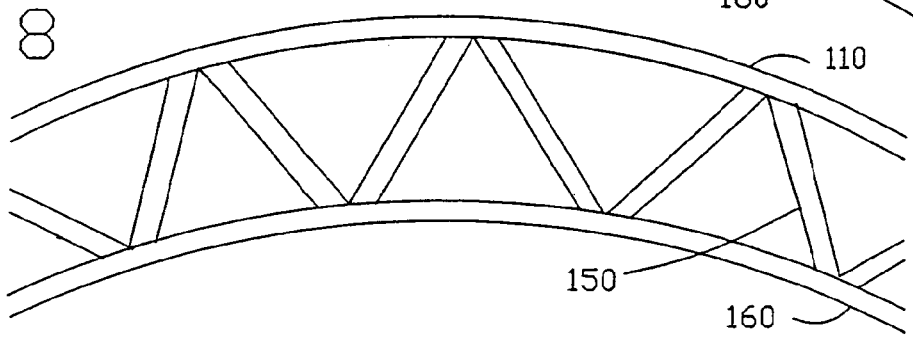
FIG. 8 is a view of an alternative arrangement of web spokes in a zig-zag pattern viewed in the equatorial plane.
Figure 9:
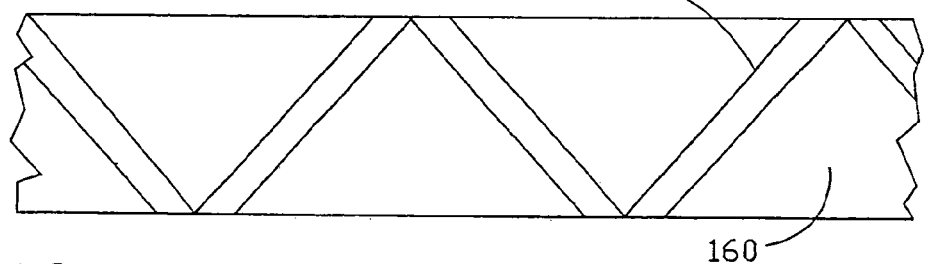
FIG. 9 is a view of an arrangement of web spokes in an oblique axial pattern viewed radially toward the axis of rotation.

For applications where high torque is expected, one of the arrangements such as those illustrated in FIGS. 7–9 may be more suitable. In FIG. 7, the web spokes 150 are oriented in a repeating X pattern as seen in the axial direction, with pairs of spokes forming the X joined at their centers. In FIG. 8, the web spokes are oriented in a zig-zag pattern relative to the radial direction. The web spokes in FIG. 9 are oriented with adjacent web spokes oppositely oriented relative to the axial direction in a zigzag pattern. In these variations, the orientations provide a force-resisting component in both the radial and the circumferential directions, thus adding resistance to torque, while retaining radial and lateral force-resisting components. The angle of orientation may be selected depending on the number of web spokes used and the spacing between adjacent web spokes.

Figure 10:
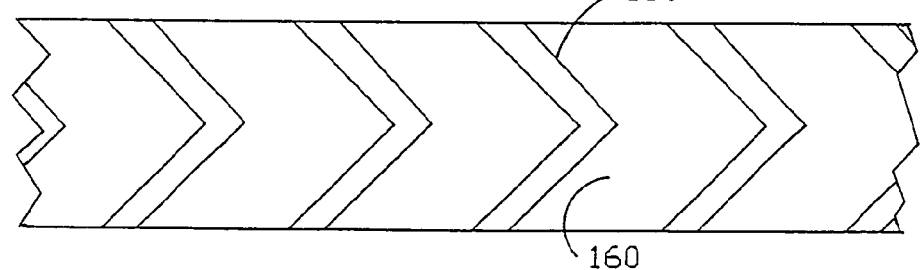
FIG. 10 shows an alternative chevron arrangement of web spokes viewed radially toward the axis of rotation.
Figure 11:
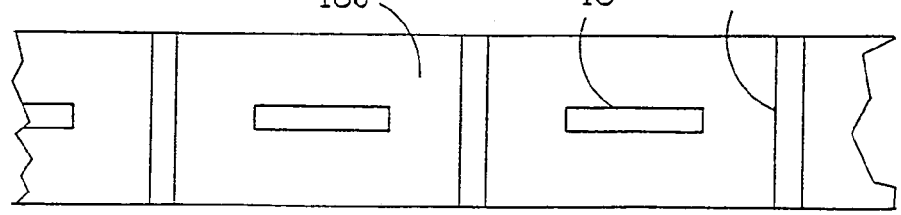
FIG. 11 is shows an alternative arrangement of alternating circumferentially- and axially-aligned web spokes viewed radially toward the axis of rotation.

Other alternative arrangements may be used. As shown in FIG. 10, the web spokes may be arranged in a chevron or v-pattern as viewed in the radial direction. Another alternative is to alternate the orientation of adjacent web spokes between axially aligned and circumferentially aligned as shown in FIG. 11. These alternatives may be less preferred, however, because of difficulties in accommodating bending of the web spokes in the contact region.

The various arrangements of the web spokes allow the vertical, lateral, and torsional stiffness of the tire to be tuned independent of the contact pressure and of each other.

Figure 12:
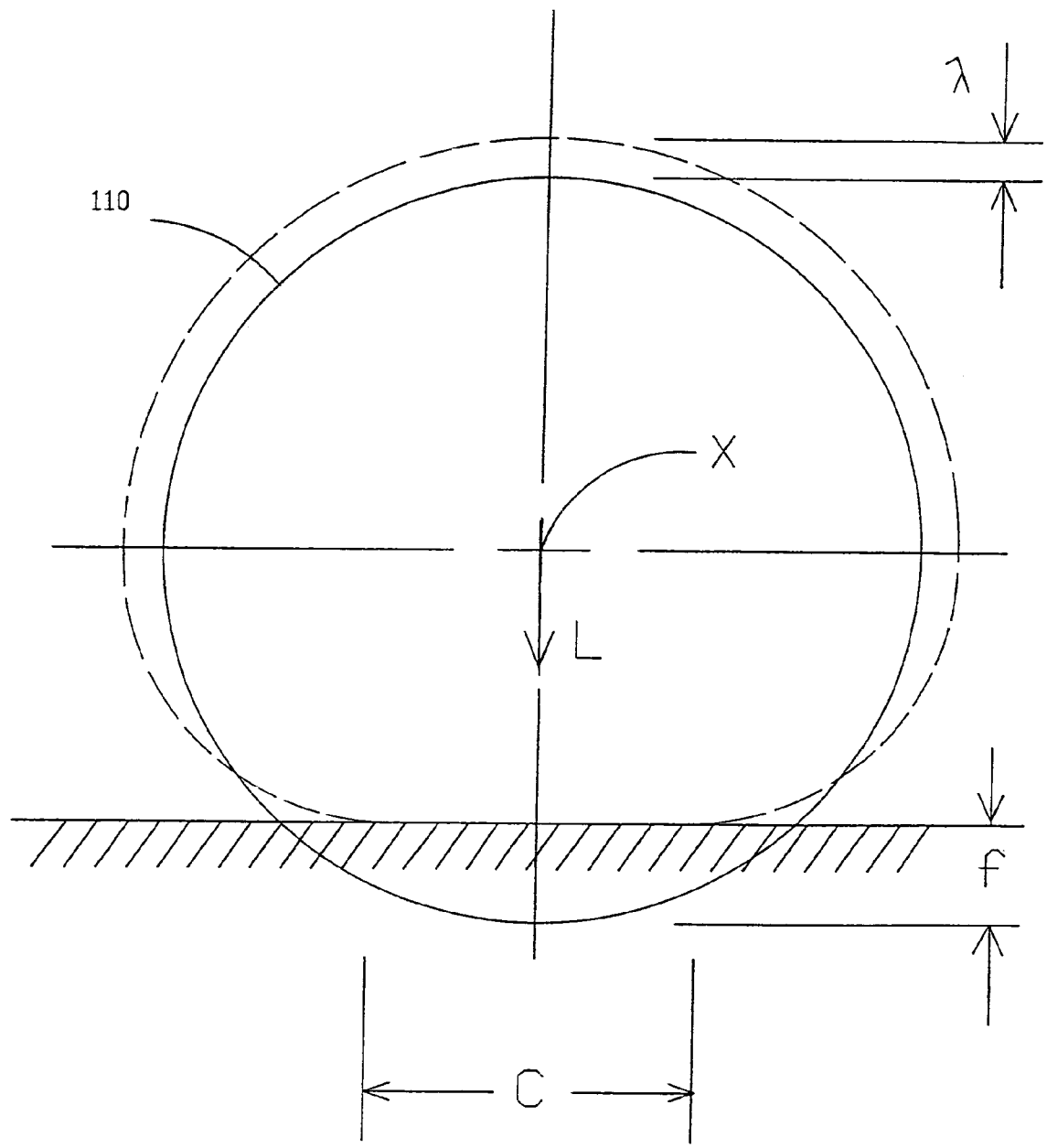
FIG. 12 illustrates schematically counterdeflection stiffness as viewed in the tire equatorial plane.

Vertical stiffness relates to the ability of the tire to resist deflection when under load. Vertical stiffness of the tire is strongly influenced by the reaction to the load of the portion of the tire not in contact with the ground, the "counterdeflection" of the tire. FIG. 12 illustrates this phenomenon in exaggerated scale. When the tire is under a load L, it deflects an amount f and the portion in ground contact conforms to the ground surface to form a ground contact area C. Note that for the purposes of this description the frame of reference in FIG. 12 maintains the tire axis X at a constant location and moves the ground upward toward the axis. The tire is a resilient body, and accordingly, vertical deflection f is proportional to the load L, from which the vertical stiffness $K_V$ of the tire may be derived. Because the annular band 110 (shown schematically) constrained by the membranes (not illustrated) seeks to maintain a constant length to conserve membrane length, the portion of the tire not in ground contact shifts, or counterdeflects, away from the contact area C, as indicated by the broken lines in the figure. The counterdeflection amount $\lambda$ is also proportional to the load L, and the counterdeflection stiffness $K_\lambda$ may thus be obtained. Counterdeflection stiffness $K_\lambda$ relates primarily to the circumferential compressive stiffness and way that the web spokes not in ground contact bear load. To a lesser extent the transverse and longitudinal bending of the annular band are involved.

Counterdeflection can be measured directly by placing a tire under a load F with the axis fixed and measuring both deflection f of the tire in the contact area and the deflection of the tread surface opposite the contact area. Counterdeflection stiffness is then determined by dividing the load F by the counterdeflection amount $\lambda$.

In practice, counterdeflection stiffness $K_\lambda$ substantially controls the vertical stiffness of the tire, and accordingly, the deflection under load of the wheel axis of a tire. Counterdeflection stiffness $K_\lambda$ determines the length of the contact area, as may be seen in FIG. 12. Low counterdeflection stiffness allows the annular band 110 to move vertically under load, and thus reduces the load capacity at that deflection. Accordingly, a tire having high counterdeflection stiffness has relatively less counterdeflection and a longer contact area.

Figure 14:
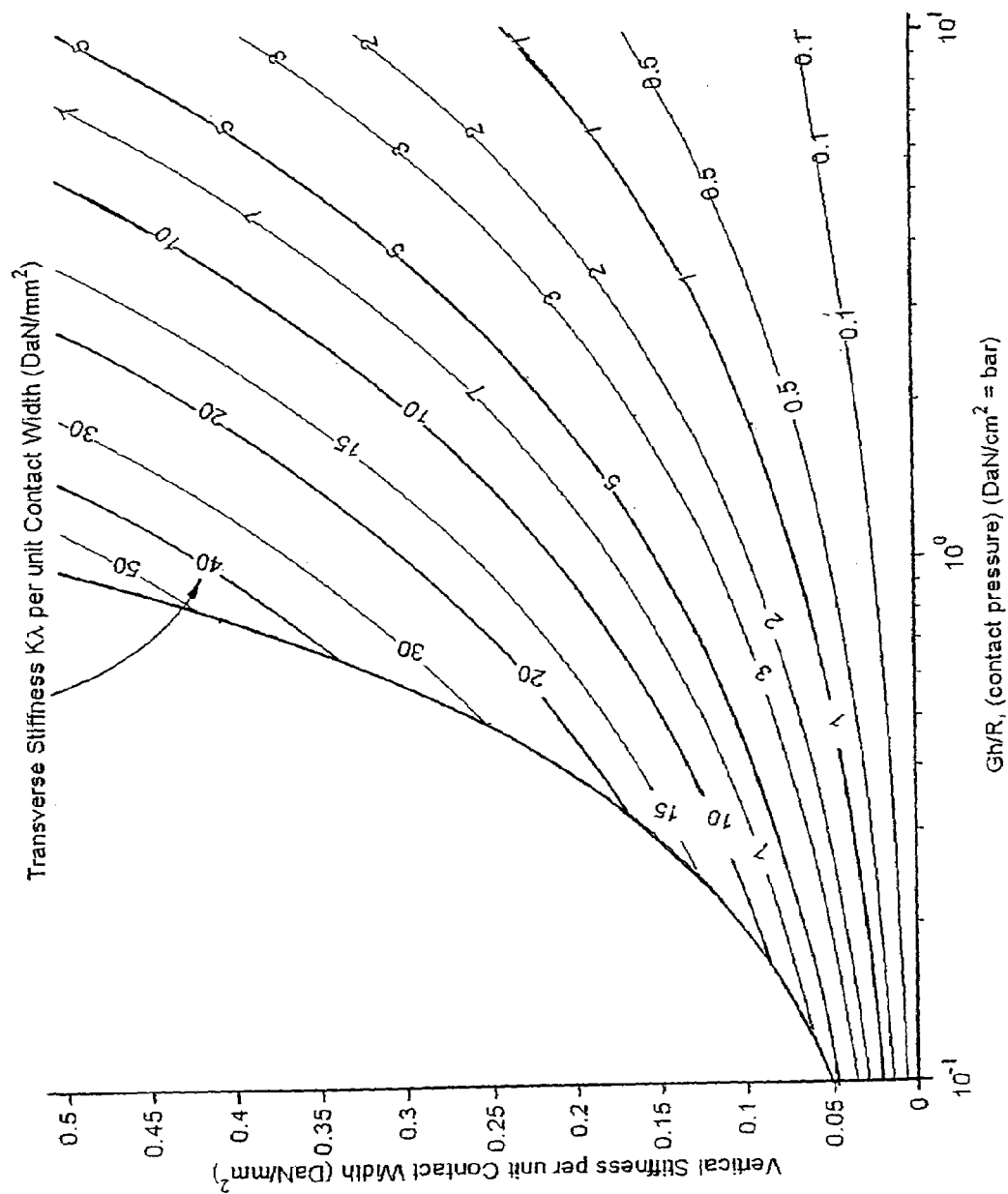
FIG. 14 illustrates graphically the relationship among contact pressure, vertical stiffness, and counterdeflection stiffness for a tire in accordance with the invention.

FIG. 14 shows graphically an approximated relationship between counterdeflection stiffness $K_\lambda$ and the vertical stiffness of the tire. FIG. 14 demonstrates the independence of vertical stiffness and contact pressure available with this invention, which allows design flexibility not available in pneumatic tires. A deflated pneumatic tire has typically a counterdeflection stiffness per unit contact area width of less than 0.1 DaN/mm². A tire in accordance with the invention, by contrast, can be designed to have a counterdeflection stiffness per unit contact area width ranging above 0.1 DaN/mm².

Advantageously, the starting design parameters for any proposed application can be selected using FIG. 14 combined with FIG. 13. Once the contact pressure, vertical load, and contact area are selected using FIG. 13, the vertical stiffness characteristics for the tire may be determined using FIG. 14. With an approximate desired value for counterdeflection stiffness $K_\lambda$ obtained from FIG. 13, the designer would then use available analytical tools, finite element analysis, for example, to specify the structure to achieve this stiffness. Further work, including building and testing tires would confirm the design parameters.

For example, to design a tire intended for passenger car use, the designer may select a design contact pressure $P_{eff}$ of 1.5 to 2.5 DaN/cm² and a tire size in which the radius R is about 335 mm. By multiplying these values, a "shear layer factor" of 50.25 to 83.75 DaN/cm may be determined, which can be used to specify the shear layer material thickness and shear modulus. In this case, with a shear modulus in the range of about 3 MPa to about 10 MPa, the thickness h of the shear layer is at least 5 mm and preferably is between about 10 mm to about 20 mm.

Further, according to the invention, the ground contact pressure and stiffness of the tire are independent of one another, in contrast to a pneumatic tire in which both are related to the inflation pressure. Thus, a tire could be designed for high contact pressure P, but relatively low stiffness. This may be advantageous in producing a tire with low mass and rolling resistance, while retaining load bearing capability.

Counterdeflection stiffness $K_\lambda$ can be modified in a number of ways. Some of the design parameters used to adjust this stiffness include the web spoke modulus, web spoke length, web spoke curvature, web thickness, the compressive modulus of the annular band membranes, the thickness of the shear layer, the tire diameter, and the width of the annular band.

Vertical stiffness can be adjusted to optimize the load carrying capability of a given tire. Alternatively, vertical stiffness can be adjusted to provide an annular band of reduced thickness for reduced contact pressure or tire mass while maintaining a desired level of vertical stiffness.

The vertical stiffness of the tire of the invention is also influenced by the effect of centripetal forces on the annular band and sidewall portions. As the speed of a rolling tire increases, centripetal forces develop. In conventional radial tires, centripetal forces can increase tire operating temperature. The tire of the invention, in contrast, obtains an unexpected beneficial result from these same forces. When the tire of the invention rotates under an applied load, centripetal forces cause the annular band to tend to expand circumferentially and induce an additional tension in the web spokes. The radially stiff web spokes for the extent of the tire out of contact (region "A" of FIG. 1) resist these centripetal forces. This produces a net upward resultant force which acts to increase the effective vertical stiffness of the tire and to reduce radial deflection of the tire relative to the static, non-rotating condition. This result is obtained to a significant degree when the ratio of the longitudinal stiffness of the band in the tire equatorial plane ($2-E'_{membrane}$) to the effective stiffness of the web spoke portion in tension is less than 100:1.

Applicants understand that many other variations are apparent to one of ordinary skill in the art from a reading of the above specification. These variations and other variations are within the spirit and scope of the instant invention as defined by the following appended claims.

What is claimed is:

1. A structurally supported tire, comprising:
   a reinforced annular band comprising an elastomeric shear layer, at least a first membrane adhered to a radially inward extent of the elastomeric shear layer and at least a second membrane adhered to a radially outward extent of the elastomeric shear layer, wherein each of the membranes has a longitudinal tensile modulus greater than a shear modulus of the shear layer and wherein a ratio of the longitudinal tensile modulus of one or more of the membranes to the shear modulus of the shear layer is at least about 100:1;
   a plurality of web spokes extending transversely across and radially inward from the reinforced annular band; and
   means for interconnecting the plurality of web spokes with a wheel.

2. The tire according to claim 1, further comprising a tread portion disposed on a radially outer extent of the reinforced annular band.

3. The tire according to claim 1, wherein said means for interconnecting the plurality of web spokes with a wheel comprises a mounting band mutually interconnecting the radially inner ends of the web spokes.

4. The tire according to claim 1, wherein said means for interconnecting the plurality of web spokes with a wheel comprises an enlarged end portion on each of said web spokes adapted to fit in an engaging slot in a wheel.

5. The tire according to claim 1, wherein the plurality of web spokes further comprises a radially outer band mutually interconnecting radially outer ends of the web spokes.

6. The tire according to claim 1, wherein each web spoke is oriented parallel to the axial direction.

7. The tire according to claim 1, wherein each web spoke is oriented oblique to the axial direction.

8. The tire according to claim 7, wherein mutually adjacent web spokes are oriented at opposite oblique angles to the axial direction.

9. The tire according to claim 1, wherein mutually adjacent web spokes are oriented at opposite oblique angles to the radial direction forming a zig-zag in the equatorial plane.

10. The tire according to claim 1, wherein the plurality of web spokes are oriented in crossed pairs forming a repeating X-pattern in the equatorial plane.

11. The tire according to claim 1, wherein the web spokes have a curvature in the equatorial plane to facilitate bending when under compression in the radial direction.

12. The tire according to claim 1, wherein a first plurality of web spokes is oriented parallel to the axial direction and a second plurality of web spokes is oriented perpendicular to the axial direction.

13. The tire according to claim 1, wherein each web spoke has a thickness tat is not more than about 5% of a radius of the tire.

14. The tire according to claim 1, wherein the ratio of the longitudinal tensile modulus of the one or more of the membranes to the shear modulus of the shear layer is at least about 1000:1.

15. The tire according to claim 1, wherein a product of the shear modulus of elasticity of the shear layer times a radial thickness of the shear layer is approximately equal to a product of a tire ground contact pressure times a radial position of the outermost extent of the second membrane.

16. The tire according to claim 1, wherein the elastomeric shear layer has a shear modulus of elasticity of about 3 MPa to about 20 MPa.

17. The tire according to claim 1, wherein each of the at least first and second membranes comprise layers of essentially inextensible cord reinforcements embedded in an elastomeric coating layer having a shear modulus of elasticity at least equal to the shear modulus of elasticity of the shear layer.

18. The tire according to claim 17, wherein the cord reinforcements of the first and second membranes form an angle with the tire circumferential direction of between about 10° and 45°.

19. The tire according to claim 1, wherein the second membrane has an arcuate transverse profile having a transverse radius of curvature less than a transverse radius of curvature of a radially outermost surface of the tread portion.

20. The tire according to claim 1 wherein the second membrane is undulated having an amplitude of undulation in the radial direction and a wavelength of undulation in the axial direction.

21. The tire according to claim 1, wherein the first and second membranes are formed of one of a homogeneous material, a fiber reinforced matrix, and a layer having discrete reinforcing elements.

22. A structurally supported wheel-tire, comprising:
a reinforced annular band comprising an elastomeric shear layer, at least a first membrane adhered to a radially inward extent of the elastomeric shear layer and at least a second membrane adhered to a radially outward extent of the elastomeric shear layer, wherein each of the membranes has a longitudinal tensile modulus greater than the shear modulus of the shear layer and wherein a ratio of the longitudinal tensile modulus of one or more of the membranes to the shear modulus of the shear layer is at least about 100:1;
a tread adhered to a radially outer extent of the reinforced annular band;
a plurality of web spokes extending substantially transversely across and radially inward from the reinforced annular band; and
a wheel radially inward of the plurality of web spokes and interconnected therewith.

23. The wheel-fire according to claim 22, wherein the wheel and the plurality of web spokes are an integrally molded unit.

24. The wheel-die according to claim 22, wherein each of the plurality of web spokes is mechanically interconnected to the wheel.

25. The wheel-tire according to claim 22, wherein the plurality of web spokes are interconnected by a mounting band which is adhered to the wheel.

26. A structurally supported tire, comprising:
a reinforced annular band comprising an elastomeric shear layer, at least a first reinforcement membrane adhered to a radially inward extent of the elastomeric shear layer and at least a second reinforcement membrane adhered to a radially outward extent of the elastomeric shear layer, wherein each of the membranes has a longitudinal tensile modulus greater than a shear modulus of the shear layer and wherein a ratio of the longitudinal tensile modulus of one or more of the membranes to the shear modulus of the shear layer is at least about 100:1; and
a plurality of web spokes extending transversely across and radially inward from the reinforced annular band and interconnecting with a surface of the reinforced annular band.

27. The tire according to claim 26, further comprising:
a mounting band mutually interconnecting the radially inner ends of the web spokes for mounting on a wheel.

28. The tire according to claim 26, further comprising:
an enlarged end portion on each of the web spokes adapted to fit in an engaging slot in the wheel for interconnecting the plurality of web spokes with a wheel.

29. The tire according to claim 26, wherein the plurality of web spokes further comprises a radially outer band mutually interconnecting radially outer ends of the web spokes to interconnect the web spokes with the surface of the reinforced annular band.

30. The tire according to claim 26, wherein the ratio of the longitudinal tensile modulus of one or more of the membranes to the shear modulus of the shear layer is at least about 1000:1.

31. The tire according to claim 26, wherein a product of the shear modulus of elasticity of the shear layer times a radial thickness of the shear layer is approximately equal to a product of a tire ground contact pressure times a radial position of the outermost extent of the second membrane.

* * * * *